United States Patent
Hakami et al.

(10) Patent No.: US 12,511,771 B2
(45) Date of Patent: Dec. 30, 2025

(54) METHOD AND SYSTEM OF REAL-TIMELY ESTIMATING DIMENSION OF SIGNBOARDS OF ROAD-SIDE SHOPS

(71) Applicant: Elm Company, Riyadh (SA)

(72) Inventors: Mohammed Yahya Hakami, Riyadh (SA); Thariq Khalid Kadavil, Riyadh (SA); Riad Souissi, Riyadh (SA)

(73) Assignee: Elm Company, Riyadh (SA)

( * ) Notice: Subject to any disclaimer, the term of this patent is extended or adjusted under 35 U.S.C. 154(b) by 516 days.

(21) Appl. No.: 18/058,796

(22) Filed: Nov. 25, 2022

(65) Prior Publication Data

US 2023/0360246 A1    Nov. 9, 2023

Related U.S. Application Data

(60) Provisional application No. 63/338,859, filed on May 5, 2022.

(51) Int. Cl.
*G06T 7/62* (2017.01)
*G06V 10/82* (2022.01)
*G06V 20/56* (2022.01)

(52) U.S. Cl.
CPC ............ *G06T 7/62* (2017.01); *G06V 10/82* (2022.01); *G06V 20/56* (2022.01); *G06T 2207/10016* (2013.01); *G06T 2207/20081* (2013.01); *G06T 2207/20084* (2013.01); *G06T 2207/30252* (2013.01)

(58) Field of Classification Search
CPC ............ G06T 7/62; G06T 2207/10016; G06T 2207/20081; G06T 2207/20084; G06T 2207/30252; G06V 10/82; G06V 20/56; G06V 10/764
See application file for complete search history.

(56) References Cited

U.S. PATENT DOCUMENTS

| | | | |
|---|---|---|---|
| 11,625,909 B1 * | 4/2023 | Zhou | G06V 10/26 |
| | | | 382/103 |
| 2015/0006278 A1 * | 1/2015 | Di Censo | G06V 20/597 |
| | | | 705/14.43 |
| 2018/0179712 A1 * | 6/2018 | Mangialardi | G09F 13/16 |
| 2018/0285663 A1 * | 10/2018 | Viswanathan | G06V 20/63 |
| 2019/0147610 A1 * | 5/2019 | Frossard | G06N 3/045 |
| | | | 382/103 |
| 2019/0225210 A1 * | 7/2019 | Herman | G08G 1/161 |
| 2021/0148719 A1 * | 5/2021 | Xu | G01C 21/3602 |
| 2021/0182596 A1 * | 6/2021 | Adams | G06V 20/588 |
| 2021/0201578 A1 * | 7/2021 | Chaudhuri | G06T 7/246 |
| 2021/0231460 A1 * | 7/2021 | Uno | G06T 7/254 |
| 2021/0279950 A1 * | 9/2021 | Phalak | G06F 18/231 |

(Continued)

Primary Examiner — Xuemei G Chen
(74) Attorney, Agent, or Firm — NKL Law; Allen Xue

(57) ABSTRACT

Provided is an edge-device based system and method for real-time detection and dimension estimation of signages by capturing images thereof by using a mounted monocular camera then processing them using a multi-module system that comprises Object Detection, Segmentation, Tracking, and Dimension Estimation modules to detect, segment, track, and estimate dimension of shop boards. The system/method also applies a deep neural network that is trained with labeled data to optimize the model parameters gathered by capturing video from moving vehicle passing through multiple different shops with unconfined locations.

12 Claims, 11 Drawing Sheets

(56) References Cited

U.S. PATENT DOCUMENTS

| | | | |
|---|---|---|---|
| 2022/0153310 A1* | 5/2022 | Yang | G05D 1/0221 |
| 2022/0198203 A1* | 6/2022 | Ben Yaacov | G06V 20/582 |
| 2022/0284807 A1* | 9/2022 | Lu | G08G 1/0112 |
| 2022/0370033 A1* | 11/2022 | Klingensmith | A61B 34/10 |
| 2023/0146924 A1* | 5/2023 | Kumar | G16H 30/40 |
| | | | 382/128 |
| 2025/0010854 A1* | 1/2025 | Cheng | G06V 10/764 |
| 2025/0014355 A1* | 1/2025 | Cheng | G06V 20/58 |

* cited by examiner

METHOD AND SYSTEM OF REAL-TIMELY ESTIMATING DIMENSION OF SIGNBOARDS OF ROAD-SIDE SHOPS

RELATED APPLICATIONS

This application claims the benefit of priority under 35 U.S.C. § 119 to U.S. Provisional Application No. 63/338,859, filed on May 5, 2022, the entire contents of which are incorporated herein by reference.

BACKGROUND

1. Field of Technology

The present disclosure relates to the field of dimension estimation of objects presented in digital photos and/or digital video footages. Specifically, the present method and/or system relates to estimating dimension of signboards of road-side shops via computer vision and artificial intelligence (AI) means in a real-time fashion. The present method and/or system also relates to pattern recognition, and machine learning.

2. Introduction of Digital Measurement of the Dimension of Objects

Manually measuring the dimension of physical objects costs time and labors, therefore taking digital photos or videos of the physical objects to be measured and then measuring the dimension of the objects based on their digital imageries is widely adopted.

3. Description of Related Art

There exists a plethora of devices with and without cameras to measure the dimension of objects, but they all suffer from various limitations, one way or another. For example, when taking digital photos for a shop signage, the process requires that the picture taker be right in front of the shop (note, a shop signage typically is located in front of the shop) with the laser equipment, and supporting structures for the laser equipment, and the process of measurement often needs multiple personnel.

After taking the digital photos of the shop signage, photogrammetry, an art and science of extracting 3D information from photographs and taking overlapping photographs of an object, structure, or space, and converting them into 2D or 3D digital models, requires 3D modeling of the shop signage, but the modeling isn't available all the time. Additionally, the photogrammetry method cannot be easily performed while the equipment involved in the measurement are in motion, as it requires controlled and calibrated motion.

There are other methods for digitally measuring shop signages, such as camera (as a photographing device) calibration and perspective geometry-based methods. These methods, however, require precise positioning and tuning of hardware and are not guaranteed to give accurate results in dimension estimation. Also, with photographing devices, the measurement is limited to short dimension objects, not to mention that with photographing devices, the devices needs to be at the same elevation as and in front of the shop signage to be measured in order to acquire a relatively accurate measure.

Specifically, most of the existing solutions using camera for measuring dimensions of an object are based on close-up 90 degrees camera shots. This means that the photographing a signboard must be done in front of each signboard with an elevated level. This also means that the cost of measurement and time required also will increase according to the number of shops inspected. The manual solution for measuring the dimension of shop signages is to send agents with a laser device that can be stationed across the signboard to measure the dimensions. Evidently, the manual solution is also a time-consuming process and requires appointing many agents and appliances. In this process, the agents spend time configuring the device and taking measurements for each board. For very accurate measurements, they must need the support from tripods too.

Certain solutions make use of camera extrinsic and intrinsic parameters in obtaining the images of shop signages. The application of the parameters requires that the camera is fixed at a particular distance and that the camera faces the measurable object at a fixed angle. However, in the problem setting of the disclosure, the shop signages are oriented in any random manner depending upon the shop and distance from the road to the shop. Moreover, the shop signages are of various geometrical structures (e.g., rectangular, not rectangular, etc.), and the shops are at diverse distances from the road, making it harder for camera to capture images of shop signages from an uniform distance. We experimented with certain geometry-based analyses like Hough transform (note, Hough transform is a feature extraction technique used in image analysis, computer vision, and digital image processing. The purpose of the technique is to find imperfect instances of objects within a certain class of shapes by a voting procedure) and corner detection (note, Corner detection is an approach used within computer vision systems to extract certain kinds of features and infer the contents of an image. Corner detection is frequently used in motion detection, image registration, video tracking, image mosaicking, panorama stitching, 3D reconstruction and object recognition), however, they yielded poor results in segmentation as well as dimension estimation.

The ideal solution for the above-mentioned setting is a generalized algorithm that can segment the shop signage from the camera image and estimate the measurement of the resulting mask of the shop signage. Neural Networks are the best function approximators for complex tasks. While using neural networks, the mathematical equations for solving the task are learned automatically using backpropagation and error optimization techniques like stochastic gradient descent. These are embedded inside the weights of the neural network and the neurons of different layers get activated accordingly. Deep Neural Networks (note, a neural network with some level of complexity, usually at least two layers, qualifies as a deep neural network (DNN). A machine learning that employs a deep learning architecture such as a DNN can constitute deep learning) require a good amount of training data to achieve this. The meticulous choice of components that build up the Deep Neural Network architecture will help in solving multi-task problems such as segmentation in conjunction with dimension estimation.

Some prior arts make use of 3D modeling of the objects of interest to extract the key points as the segmentation points and thus take the measurement. This approach is error-prone in the context of shop signages since the shop signages do not have standard structures. Moreover, it is not possible to map the shop signages in 3D because it is infeasible to go around the shop signage to map the key points. Consequently, the Deep neural network has to rely on the shop signage being a 2D object, segment the 2D object and then estimate its height and width of it based upon the obtained mask. Thus, instance segmentation-based neural network would be the right choice for shop signage.

One of the challenges that must be solved in the invention is to detect only the nearest shop signboard of interest automatically and estimate the dimensions. Traditional methods like camera geometry require handcrafted equations and post-processing calculations to conduct the estimation and thus they are cumbersome. However neural networks can be trained to automatically detect the region of interest for a given image.

4. The Needs for Improvement

Evidently, there are needs to improve the easiness, efficiency, re-useability and accuracy of estimation of dimensions of shop signboards or signages (note, the two terms—signboard and signage—are interchangeable in this disclosure), and to reduce labor and equipment involvement. More importantly, there is a need to have a system/method that can real-timely estimate dimension of shop signboards, and any signboards regardless of their purpose by using off-the-shelf technologies such as edge devices, vehicle mounted camera, computer vision algorithms, and machine learning algorithms, and etc. The real-time-ness of the system/method is necessary for having a streamlined process of regulating shop signboards in some municipal jurisdictions. Embodiments in this disclose may use "shop signs", "shop signages", "shop sign", or "shop signage" as an example. However, the method and device are broadly applicable to measure the size of a variety of signages, such as shop signs, billboards, road sings, or posters.

SUMMARY OF THE DESCRIPTION

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The purpose of the present disclosure is to resolve the aforementioned problems and/or limitations of the conventional technique, that is, to provide a solution for effectively and conveniently sharing and verifying digital identity claims using portable smart devices facilitated by enabling apps, and a middleware layer that interfaces the various apps, and a backend system (identity management and storage system) that interoperates with the middleware layer.

Provided is a computer-implemented method for real-timely estimating dimension of signage, comprising: capturing and storing a first set of still images or video footages that contain a first set of signages by using a first photographing device carried on a first moving vehicle; extracting a first set of spatial features from the first set of still images or video footages; detecting a first set of signages and a first set of masks by using a Fully Convolutional Neural Networks (FCNN) based on the first set of spatial features; localizing the first set of signages by using a tracking system to identify ownership information of each sign of the first set of signages to produce a first set of identification associated with the first set of signages; passing the first set of signages and the first set of masks into a pre-trained Multi-Layer Perceptron (MLP) neural network to estimate a first set of dimension values by regressing dimension values based on a loss function applied on the first set of masks, wherein each dimension value in the first set of dimension values contains a height value and a width value; and recording on a edge device, and transmitting and registering the first set of signages in association with the first set of identification and a first set of dimension values to a remote database.

In one embodiment of the provided method, the step of detecting the first set of signages and the first set of masks comprises calculating a mask loss value using Binary Cross Entropy (BCE) for each of the first set of masks, and calculating a first total loss value based on the mask loss value for each of the first set of masks, and using the first total loss value to adjust, using a stochastic gradient descent, a plurality of weights associated with the FCNN, via back-propagation, to steer the FCNN to learn from the first set of still images or video footages.

In another embodiment of the provided method, the step of localizing further comprises: obtaining a first set of GPS location values corresponding to the first set of signages, and associating and the first set of GPS location values with the first set of signages.

In a further refinement of the embodiment stated in the paragraph before the immediately above paragraph, wherein the pre-trained MLP neural network is trained, in a training session, based on a second set of still images or video footages that contain a second set of signages, wherein the training session comprises: extracting a second set of spatial features from the second set of still images or video footages, detecting a second set of signages and a second set of masks by using the FCNN based on the first set of spatial features, labeling each of the second set of signages with its corresponding polygon marks in the second set of masks, concatenating each of the second set of still images or video footages with its corresponding dimension values in the second set of dimension values, to form a set of combined sample data, and feeding the set of combined sample data to the MLP neural network to create a trained model; wherein each dimension value in the second set of dimension values contains a height value and a width value that are manually measured, and the labeling comprises putting points at corners of each of the second set of signages that are fully visible, and wherein the step of detecting the second set of signages and the second set of masks comprises calculating a mask loss value using BCE for each of the second set of masks, and calculating a second total loss value based on the mask loss value for each of the second set of masks, and using the second total loss value to adjust, using a stochastic gradient descent, a plurality of weights associated with the FCNN, via back-propagation, to steer the FCNN to learn from the second set of still images or video footages.

In a further refinement of the embodiment stated in the previous paragraph, during the training session, 20% of the set of combined sample data are reserved as a set of validation sample data to be used in a validation session, wherein during the validation session, the set of validation sample data is used to calculate a smooth_L1 loss value (Smooth L1 Loss) and a mape_loss value ("mean average precision error loss") to monitor the quality of the training of the MLP neural network by comparing the dimension values estimated by the MLP neural network and the measured dimension values that come with the set of validation sample data.

In a further refinement of the embodiment, the provided method further comprising, further comprising, augmenting, as a part of the training session, to enhance the accuracy of training, by removing the MLP neural network's dependency on color, size of the second set of images or video footages, lightening condition under which the second set of images or video footages are captured, or the type of photographing device used for capturing the second set of images or video footages.

In another further refinement of the embodiment, the second set of still images or video footages are captured by a second photographing device mounted on a second moving vehicle at a different time and location from when and where the first set of still images or video footages are captured.

Provided is a system, comprising: an edge device, a photographing device that are onboard a first moving vehicle, wherein the edge device comprises a GPU, a processor, one or more computer-readable memories and one or more computer-readable, tangible storage devices, a GPS Unit, a GSM module, a power management unit, a supervisor unit, and a control unit, and a portable computing toolkit, and wherein the photographing device is connected to the edge device for captured video stream of roadside scenes to be channeled to the edge device's video buffer, and the photographing device is placed inside the first moving vehicle on the windshield or on the top of the first moving vehicle, to perform operations, the operations comprising: capturing and storing a first set of still images or video footages that contain a first set of signages by using the photographing device, extracting a first set of spatial features from the first set of still images or video footages, detecting a first set of signages and a first set of masks by using a Fully Convolutional Neural Networks (FCNN) based on the first set of spatial features; localizing the first set of signages by using a tracking system to identify ownership information of each sign of the first set of signages to produce a first set of identification associated with the first set of signages, passing the first set of signages and the first set of masks into a pre-trained Multi-Layer Perceptron (MLP) neural network to estimate a first set of dimension values by regressing dimension values based on a loss function applied on the first set of masks, wherein each dimension value in the first set dimension values contains a height value and a width value, and recording on the edge device, and transmitting and registering the first set of signages in association with the first set of identification and a first set of dimension values to a remote database, wherein the extracting, detecting, and passing steps are carried on by one or more computer programs loaded in the one or more computer-readable memories and executed by the processor or the GPU.

In an embodiment of the provided system, the step of detecting the first set of signages and the first set of masks comprises calculating a mask loss value using Binary Cross Entropy (BCE) for each of the first set of masks, and calculating a first total loss value based on the mask loss value for each of the first set of masks, and using the first total loss value to adjust, using a stochastic gradient descent, a plurality of weights associated with the FCNN, via back-propagation, to steel the FCNN to learn from the first set of still images or video footages.

In another embodiment of the provided system, the step of localizing further comprising: obtaining a first set of GPS location values corresponding to the first set of signages, and associating and the first set of GPS location values with the first set of signages.

In an embodiment of the provided system, wherein the pre-trained MLP neural network is trained, in a training session, based on a second set of still images or video footages that contain a second set of signages, wherein the training session comprising: extracting a second set of spatial features from the second set of still images or video footages, detecting a second set of signages and a second set of masks by using the FCNN based on the first set of spatial features, labeling each of the second set of signages with its corresponding polygon marks in the second set of masks at, concatenating each of the second set of still images or video footages with its corresponding dimension values in the second set of dimension values, to form a set of combined sample data, and feeding the set of combined data to the MLP neural network to create a trained model; wherein each dimension value in the second set dimension values contains a height value and a width value that are manually measured, and the labeling comprises putting points at corners of each of the second set of signages and only the completely visible signages in the second set of signages are labeled, and wherein the detecting a second set of signages and a second set of masks by using the FCNN based on the second set of spatial features comprises calculating a mask loss value using BCE for each of the second set of masks, and calculating a second total loss value based on the mask loss value for each of the second set of masks, and using the second total loss value to adjust, using a stochastic gradient descent, the various weights associated with the FCNN, via back-propagation, to steel the FCNN to learn from the second set of still images or video footages.

In a refinement of the embodiment stated above, during the training session, 20% of the set of combined sample data are reserved as a set of validation sample data to be used in a validation session, wherein during the validation session, the set of validation sample data is used to calculate a smooth_L1 loss value (Smooth L1 Loss) and a mape_loss value ("mean average precision error loss") to monitor the quality of the training of the MLP neural network by comparing the dimension values estimated by the MLP neural network and the measured dimension values that come with the set of validation sample data.

In another refinement of the embodiment stated above, wherein the second set of still images or video footages are captured by a second photographing device carried on a second moving vehicle at a different time and location from when and where the first set of still images or video footages are captured.

In yet another refinement of the embodiment stated above, the embodiment further comprises, augmenting, as a part of the training session, to enhance the accuracy of training, by removing the MLP neural network's dependency on color, size of the second set of images or video footages, lightening condition under which the second set of images or video footages are captured, or the type of the second photographing device.

Other features and aspects will be apparent from the following detailed description, the drawings, and the claims.

BRIEF DESCRIPTION OF THE DRAWINGS

The present disclosure is illustrated by way of example and not limited in the figures of the accompanying drawings in which like references indicate similar elements.

DETAILED DESCRIPTION

Various embodiments and aspects of the disclosures will be described with reference to details discussed below, and the accompanying drawings will illustrate some embodiments. The following description and drawings are illustrative of the disclosure and are not to be construed as limiting the scope of the disclosure. Numerous specific details are described to provide an overall understanding of the present disclosure to one of ordinary skill in the art.

Reference in the specification to "one embodiment" or "an embodiment" or "another embodiment" means that a particular feature, structure, or characteristic described in conjunction with the embodiment can be included in at least one embodiment of the disclosure but need not be in all embodiments. The appearances of the phrase "in one embodiment" in various places in the specification do not necessarily all refer to the same embodiment.

Embodiments use vehicle-mounted cameras to photographing and/or videorecording shop signboards from roadside and then use edge devices or computers to estimate dimension of the photographed/video-recorded signboards based on the recorded photos and/or video footages in a real-time fashion. During the process, the vehicle on which the vehicle-mounted camera is mounted and the edge device or computer is hosted does not stop on the road when the road-side shops are encounter, making the process convenient, efficient, and cost-effective. During the process, the identity of the road-side shops is also acquired by using GPS devices to extract the GPS coordinates of the location of the shops and from which, to derive the identities of the shops.

Figure 1:
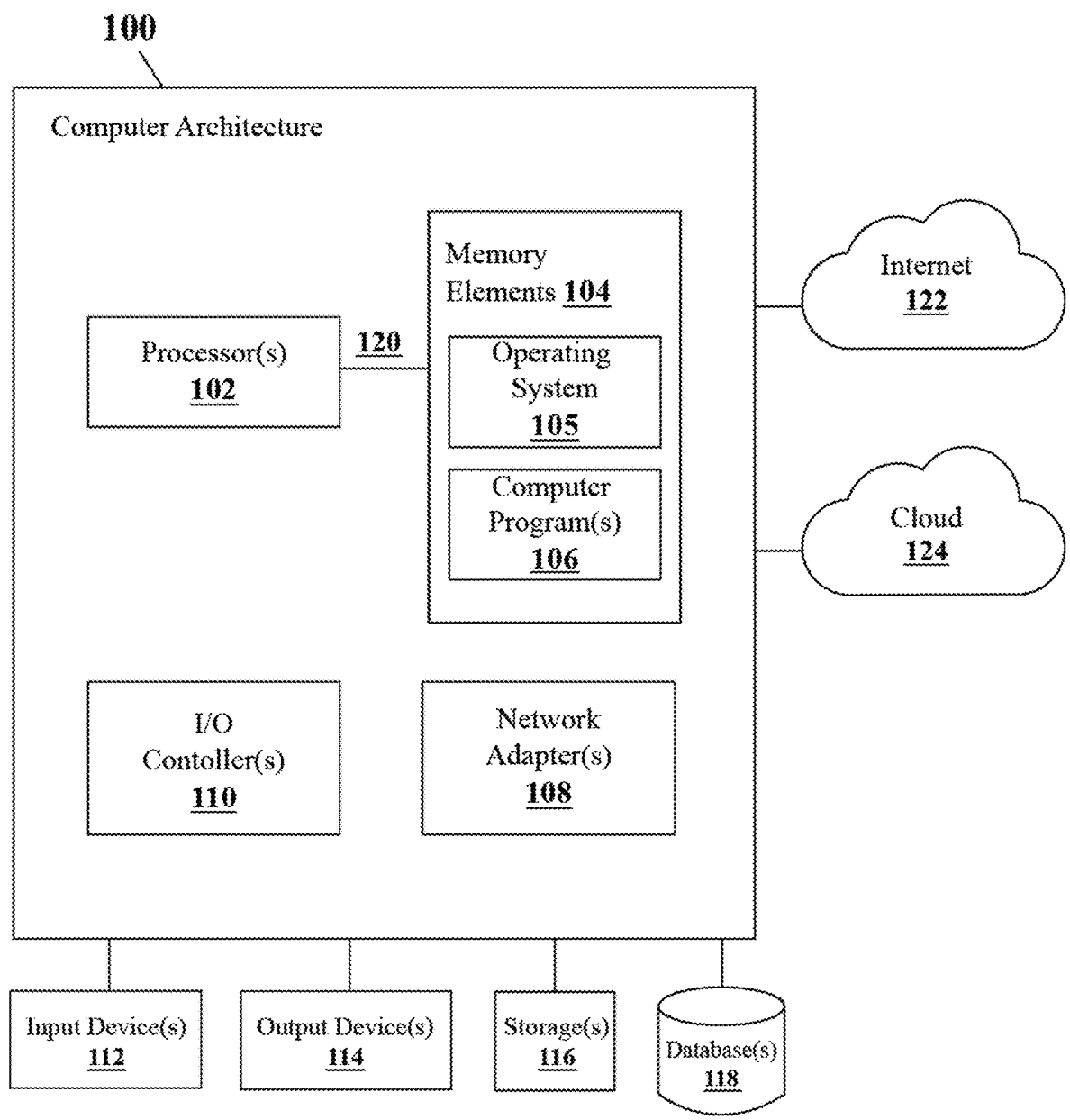
FIG. 1 schematically illustrates, in a schematic block diagram, a computing environment being used in either the frontend, a middleware layer, or the backend of the system accordance with certain embodiments. The environment, in certain embodiments, may include blockchain related features (not shown, but are implicit in the Computer Programs) in the case of the backend system being a system with a blockchain architecture.

FIG. 1 illustrates a computer architecture 100 that may be used in accordance with certain embodiments. In certain embodiments, the identity claim data collection, storage, and process use computer architecture 100. The computer architecture 100 is suitable for storing and/or executing computer readable program instructions and includes at least one processor 102 coupled directly or indirectly to memory elements 104 through a system bus 120. The memory elements 104 may include one or more local memories employed during actual execution of the program code, bulk storage, and cache memories which provide temporary storage of at least some program code in order to reduce the number of times code must be retrieved from bulk storage during execution. The memory elements 104 include an operating system 105 and one or more computer programs 106, and the operating system 105, as understood by one skilled in the computer art, controls the operation of the entire computer architecture 100 and the computer architecture 100's interaction with components coupled therewith such as the shown components (input device(s) 112, output device(s) 114, storage(s) 116, databases 118, internet 122, and cloud 124) and unshown components that are understood by one skilled in the art, and the operating system 105 may be switched, upgraded, downgraded, and changed as fit.

Input/Output (I/O) devices 112, 114 (including but not limited to keyboards, displays, pointing devices, transmitting device, mobile phone, edge device, photographing device such as camera, verbal device such as a microphone driven by voice recognition software or other known equivalent devices, etc.) may be coupled to the system either directly or through intervening I/O controllers 110. More pertinent to the embodiments of disclosure are cameras as one genre of input device. Touchable screen of a smartphone/smartwatch along with other buttons of the phone/watch constitute input devices. Also, the cameras of a smartphone/smartwatch are also input devices, which are used to take pictures or footages of the objects of interest.

Input Devices 112 receive input data (raw and/or processed), and instructions from a user or other source. Input data includes, inter alia, (i) commands/instructions issued by the users of the devices, (ii) captured pictures or video footages, and/or (iii) other conceivable data inputs by the users of the system.

Network adapters 108 may also be coupled to the system to enable the data processing system to become coupled to other data processing systems, or remotely located central server(s), or remote printers or storage devices through intervening private or public networks. Modems, cable modem and Ethernet cards are just a few of the currently available types of network adapters 108. Network adapters 108 may also be coupled to internet 122 and/or cloud 124 to access remote computer resources. Network adapters 108 may be coupled to the frontend terminals to facilitate interactions among the devices and interactions between frontend terminals and backend system.

The computer architecture 100 may be coupled to storage 116 (e.g., any type of storage device; a non-volatile storage area, such as magnetic disk drives, optical disk drives, a tape drive, etc.). The storage 116 may comprise an internal storage device or an attached or network accessible storage. Computer programs 106 in storage 116 may be loaded into the memory elements 104 and executed by a processor 102 in a manner known in the art.

Computer programs 106 may include programs or apps related to computational estimation of dimension of a sign captured in a photo and/or video, and the computer programs 106 may either entirely or partially reside in storage 116 and partially reside in cloud 124 or internet 122, and the computer programs 106 may fluidly and dynamically be transferred from one location in a local storage 116 to and from cloud 124 or internet 122 as the circumstances may demand.

The computer architecture 100 may include fewer components than illustrated, additional components not illustrated herein, or some combination of the components illustrated and additional components. The computer architecture 100 may comprise any computing device known in the art, such as a mainframe, server, personal computer, workstation, laptop, handheld computer, telephony device, network appliance, virtualization device, storage controller, virtual machine, smartphone, tablet, wearable devices, etc.

Input device(s) 112 transmits input data to processor(s) 102 via memory elements 104 under the control of operating system 105 and computer program(s) 106. The processor(s) 102 may be central processing units (CPUs) and/or any other types of processing device known in the art. In certain embodiments, the processor(s) 102 are capable of receiving and processing input data from multiple users or sources, thus the processor(s) 102 have multiple cores. In addition, certain embodiments involve intensive computations when managing identity claim data's storing and indexing, these embodiments therefore employ graphic processing units (GPUs) as the processor(s) 102 in lieu of or in addition to CPUs.

Certain embodiments also comprise at least one database 118 for storing desired data. Some raw input data are converted into digitized data format before being stored in the database 118 or being used to create the desired output data. It's worth noting that storage(s) 116, in addition to being used to store computer program(s) 106, are also sometimes used to store input data, raw or processed, and to store intermediate data. The permanent storage of input data and intermediate data is primarily database(s) 118. It is also noted that the database(s) 118 may reside in close proximity to the computer architecture 100, or remotely in the cloud 124, and the database(s) 118 may be in various forms or database architectures.

Because certain embodiments need a storage for storing large volumes of video footage related data, more than one database is likely used.

Figure 2:
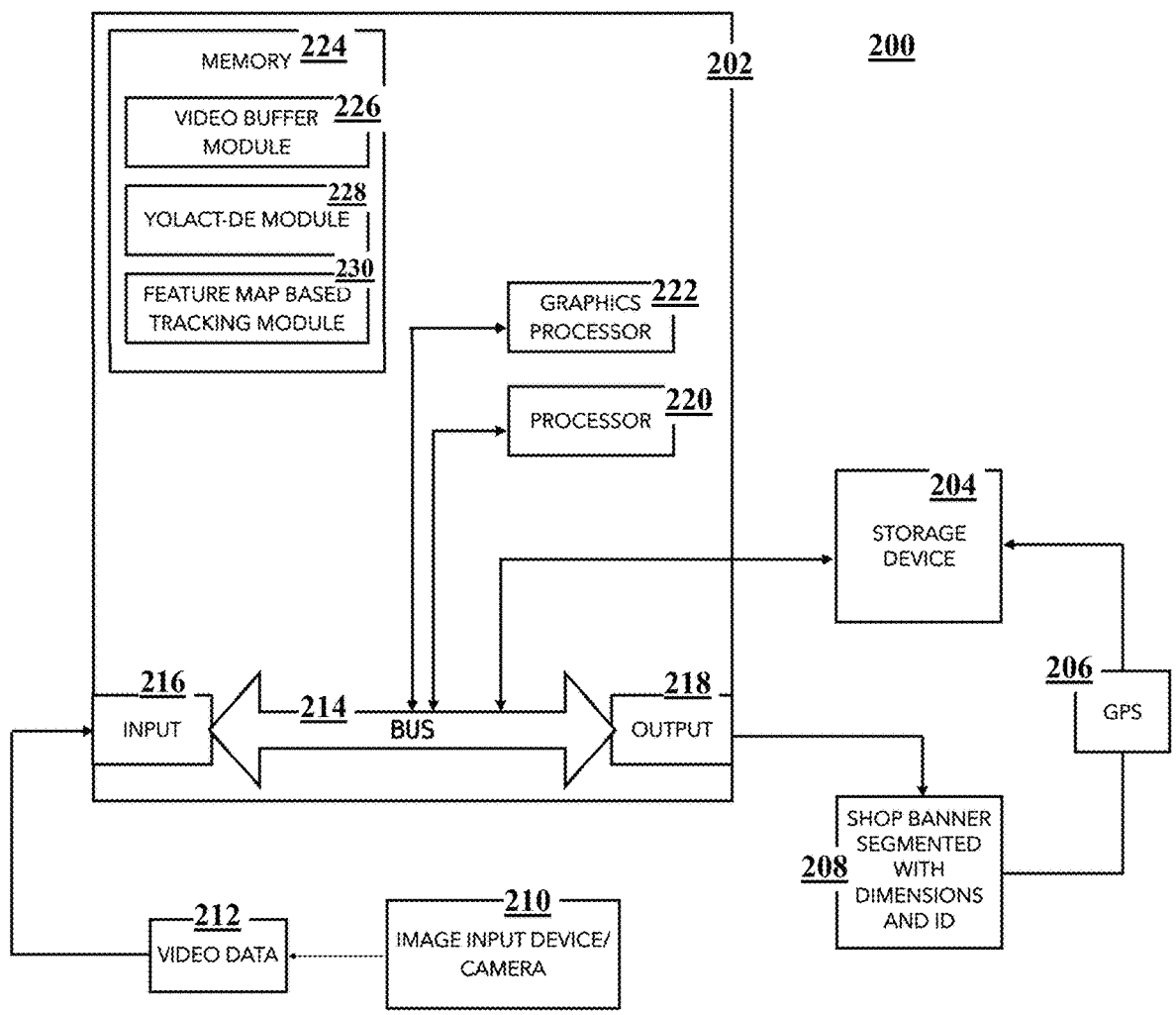
FIG. 2, expending on FIG. 1, schematically illustrates, in a schematic block diagram, a computing environment with elaborated description on a few key parts of the environment that play key roles in the disclosure.

FIG. 2 shows a setup 200 in which a general computing environment with a few more details than FIG. 1 shows. In the main part (202) of the setup 200, the memory 224 contains a few modules such as video buffer 226, YOLACT-DE ("You Only Look At CoefficienTs-Dimension Estimation") module 228, and a feature map based tracking module 230. The video buffer 226 is a buffer zone where video footages (or still images) to be processed by the processors 220 and 222 are held. YOLACT-DE 228 is a Neural Network module for dimension estimation. The feature-map-based tracking module 230 is a software module that implements a tracking algorithm that tracks object locals based on previous image frames features that include spatial and local details. The GPU 222 and CPU 220 have connection(s) (not shown) with the memory 224, and the processors work together with the modules in memory 224 to process data stored in the memory 224 (such as the video/image data stored in the video buffer module 226) by using programs such as YOLACT-DE module 228 and/or feature map based tracking module 230 to produce results that is passed through bus 214 to the output outlet 218 which in turn displays and/or records shop banner segmented with dimensions and ID (208). 230 is the module where the shop signage is tracked using the feature map obtained from the Convolutional Neural Network (which will be discussed in detail later in this disclosure). Using such a tracking module, an object can be located across multiple continuous frames. The tracking module 230 pinpoints the same shop signage to be measured.

Bus 214 has a direct connection with other bus 214, and thus the bus can direct write to the storage device 204 to record the result to be output. A GPS device 206 is also connected to the storage 204, writing GPS coordinates of an object of interest to the storage device 204. GPS 206, also, can augment/annotate the output result 208 in the form of an identification of a shop (which is derived from the GPS coordination). Therefore, the GPS 206 may have computing resource to derive the identification from a GPS coordination. The identification of the shop contains the information of the ownership of the shop, and it will be used to label and register the shop signage.

Image input device/camera 210 is used to capture photos and/or video footages of road-side shopfronts, and the video data 212 created from 210 is streamed to the input module 216, which is connected to the bus 214. The bus may pass the video data 212 received from the input module 216 directly to the storage device 204 for storing the data therein for later use.

Or, the video data 212 is directly passed to the processors 222 and 220, which may cache the video data to the video buffer module 226 of the memory 224 for immediate and/or slightly later use.

With the setup 200, the present disclosure relates to a video-based method and system for determining shop signage dimension violations in real-time from a moving vehicle that is patrolling the city neighborhoods. The technique can detect and estimate the signboard dimensions without the help of a human agent. The system saves all pictures of the detected signboards and estimated height and width in the computing environment of 200 for official purposes. The system also holds the GPS location (facilitated by GPS unit 206) and view of the signboard for proof. The disclosure also teaches a system for detecting shop signage and estimating dimensions in any street. The method includes training, in a training session, a neural network to classify, localize, and segment the detected signboard to estimate the dimensions. The system consists of a USB camera such as 210, an edge computing device (such as 202) including a memory 224 for storing the signboard image or video footage and dimensions with a GPS unit 206 to capture the shop's location. The system also includes Object Detection, Segmentation, Tracking, and dimension Estimation multi-module system. A graphics processor 222 and a processor 220 are in communication with the memory 224 and are operative to execute the modules such as 228 and 230. The modules collectively start by extracting spatial features and then proceeds to localize and detect the signboard using the extracted feature. extracted features are then sent to a Fully Convolutional Neural Networks (FCNN) to have precise segmentation. The localization step is conducted in the tracking system to identify multiple IDs from frames belonging to the same shop. The masks are then extracted from FCNN and processed then passed into Multi-layer Perceptron (MLP) neural network for height and width estimation.

Figure 3:
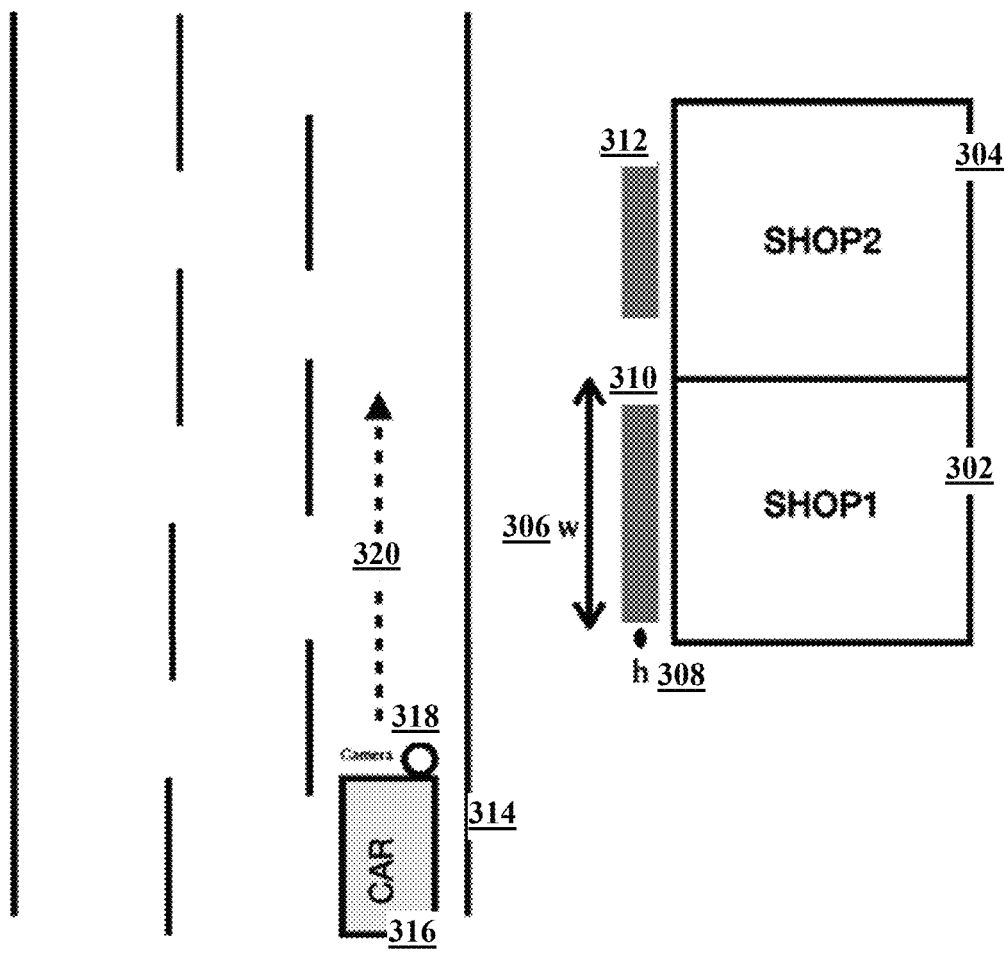
FIG. 3 schematically renders a typical scenario of real-timely estimating shop signboards.

Referring to FIG. 3, along the road 314, there are two shops 302 and 304 (both are to the right-hand side of the road 314 when viewing along the direction of 320), each of which has a shopfront signboard 310 and 312 respectively. Each signboard has a dimension consisting of a height and a width. For example, signboard 310 has a height of 308 and a width of 306.

A vehicle such as a car 316 is moving along the direction of 320 along the road 314, a camera 318 mounted on the car at the right side thereof takes photos and/or videos of the shopfronts of the two shops 302 and 304. The mounting location of the camera 318 on the car 316 is flexible, so long as the location gives the camera an unobstructed view of the shopfronts. It is conceivable that should the shops are located on the left side of the road 314, the car 316 would drive on the most left lane of the road 314, and has camera 318 mounted on the left side thereof.

As discussed in the background section, there exists a need for a solution to detect and estimate the dimensions of signages that can be ported onto an edge-computing device. This solution should be able to speed up the process of shop signage dimension estimation by human beings by multifold. This disclosure presents an apparatus and a method for detecting and estimating the dimensions (width and height) of signages by the roadside from a moving car.

Figure 4A:
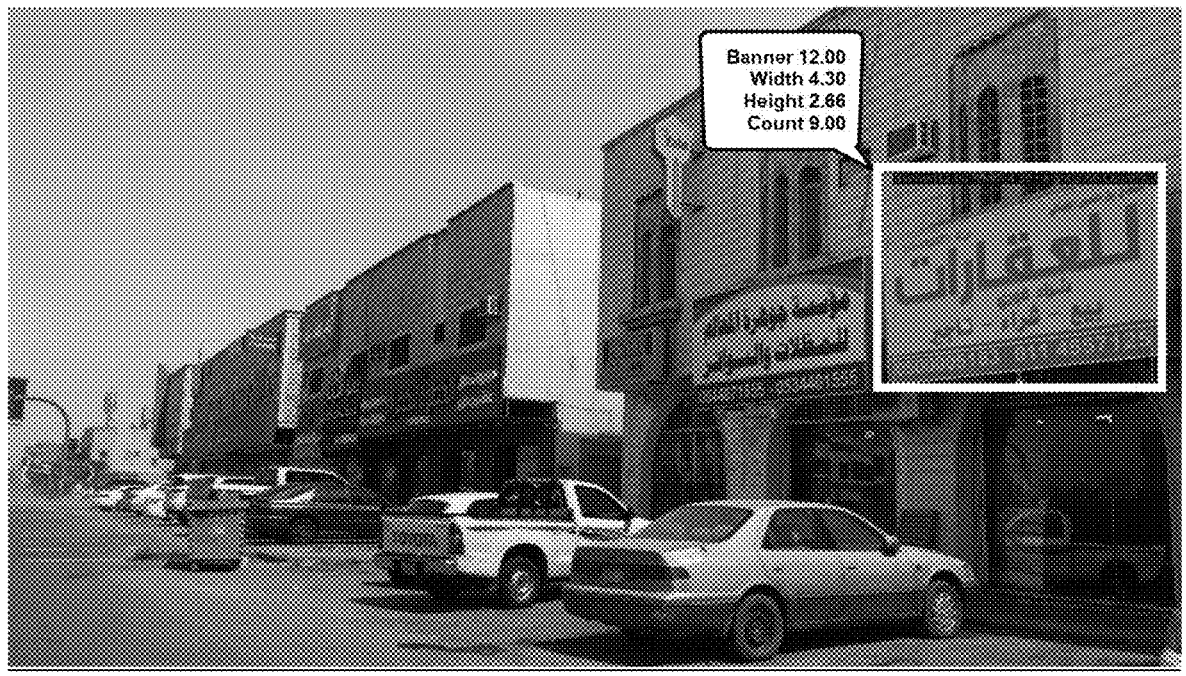
FIGS. 4A, 4B, and 4C, are three photos of three different streets of shops, wherein each has one shop whose shopfront wall mounted signboard marked with estimated dimensions.
Figure 4B:
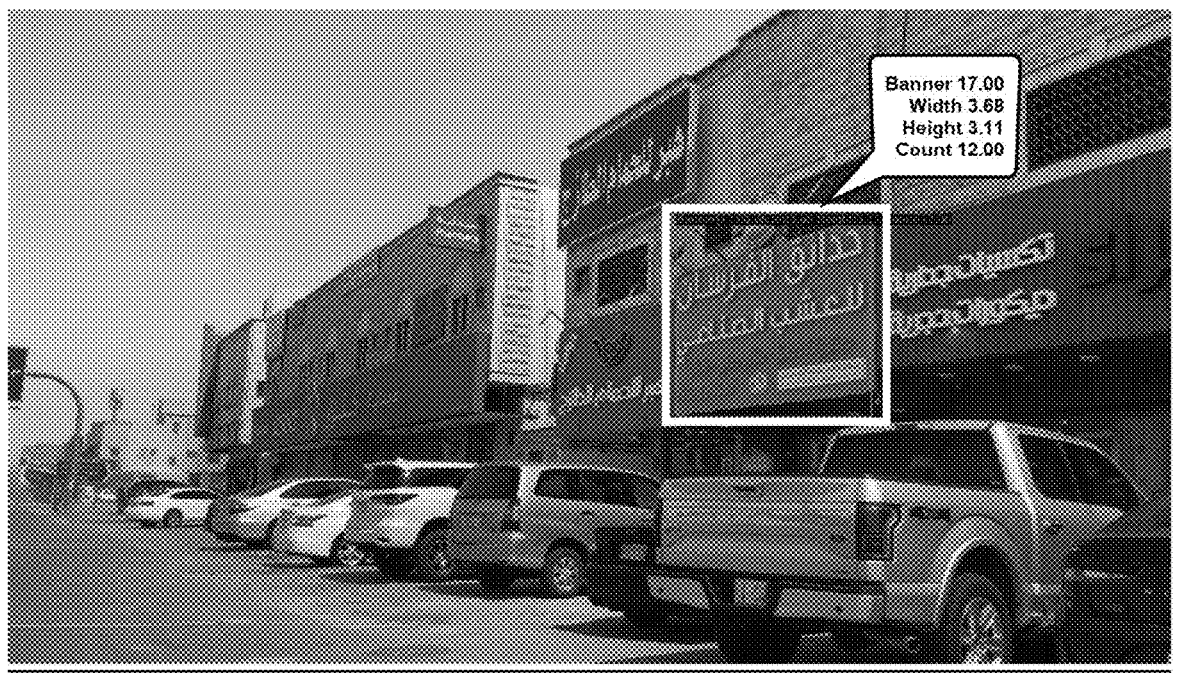
Figure 4C:

Referring to FIGS. 4A, 4B, and 4C, the system operates in real-time by detecting and segmenting the signages followed by dimension estimation while counting and assigning unique ID to each shop sign. The shop in FIG. 4A presents a med-sized shop sign (located at above the most-right shop in the image) marked with borders and information including the estimated width of the sign (4.30 meters) and the estimated height of the sign (2.66 meters). FIG. 4B shows another detected mid-sized shop sign located at above the second to the most-right shown shop, and the sign is marked with borders and information including the estimated width of the sign (3.68 meters) and the estimated height of the sign (3.31 meters). FIG. 4C shows a detected long shop sign board that spans across from the location of the far white car to the near gray car, and the sign is marked with borders and information including the estimated width of the sign (16.08 meters) and the estimated height of the sign (3.24 meters).

According to one aspect of the disclosure, the system comprises an onboard edge device and the camera wherein the onboard edge device further comprises a GPU, a processor, a GPS Unit, a GSM module, a power management unit, a supervisor unit, and a control unit. The GPU and the processor can be accommodated by using any of the latest portable computing devices like the NVIDIA Jetson series or Intel toolkits. A camera is connected to this device for the video stream to be channeled from the roadside to the device's video buffer. It is connected through USB 3.0. The camera can be any portable camera that is configurable with the mentioned portable computing devices.

The onboard edge device saves all pictures/video-footages of the shop with the signages for official purposes. The onboard edge device also saves the GPS location of the shop. The onboard edge device solves the problems mentioned in the prior art. The apparatus connections and setup are shown in FIG. 5.

Figure 5:
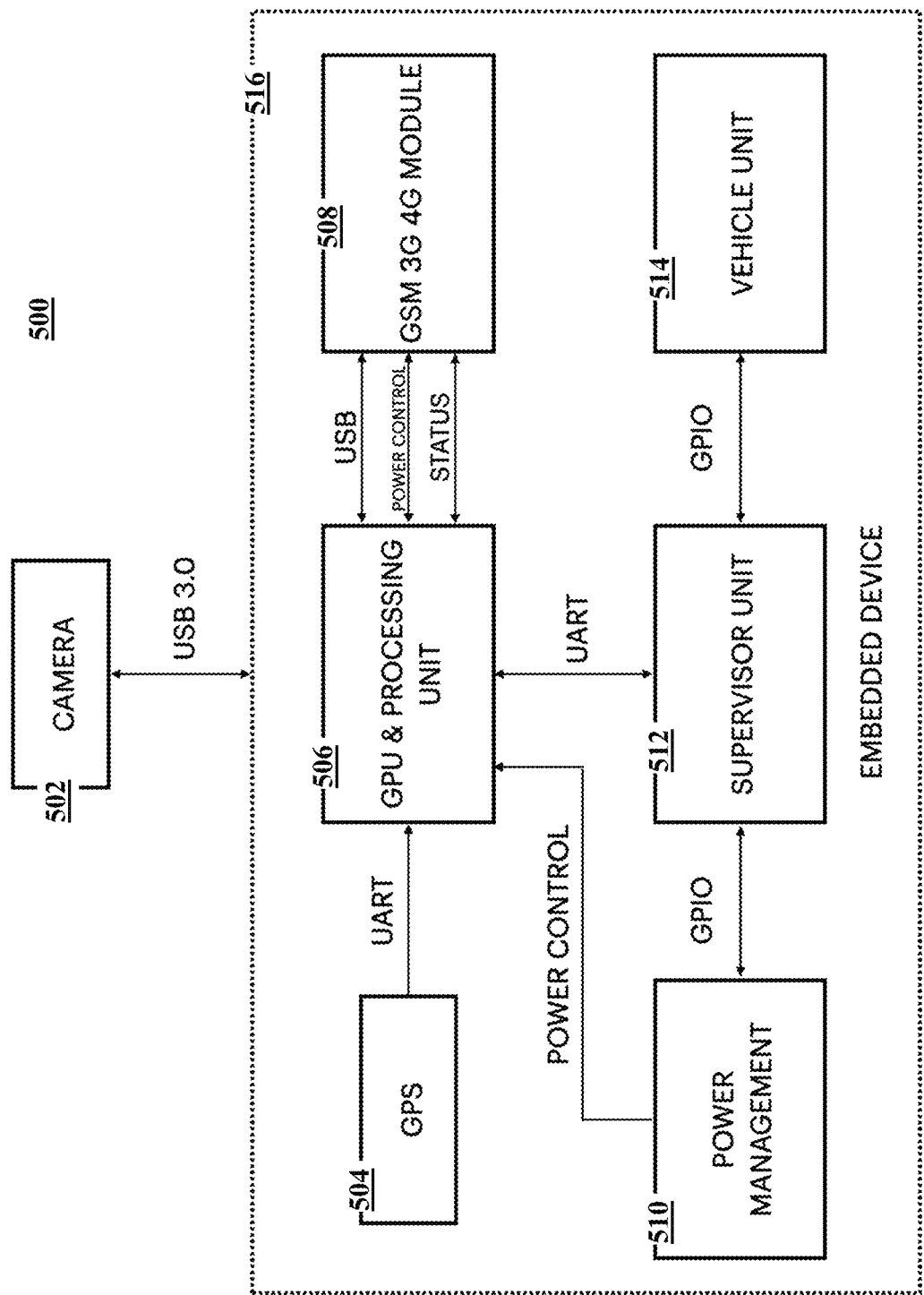
FIG. 5 schematically renders one of the configurates and setups of apparatuses and cameras that are used in capturing needed images and other information which are later used in shop sign dimension estimation and identification.

Referring to FIG. 5, in the setup 500, the camera 502, in some embodiments, is communicatively connected (via an USB 3.0 connection) to an embedded device 516. Embedded device 516 can be an edge device that includes a GPS unit 504, a GPU and processing unit 506, a GSM ("Global System for Mobile Communications") 3G or 4G module 508, a power management unit 510, a supervisor unit 512, and a vehicle unit 514. The GPS unit 504 supplies GPS information via an UART connection ("universal asynchronous receiver-transmitter") to the GPU & processing unit 506, in which Graphics Processor(s) 222 and Processor(s) 220 co-process loaded software programs in a collaborative way, and which communicates with the supervisor unit 512 with an UART connection as well. The supervisor unit 512 communicates with the power management unit 510 and the vehicle unit 514 via GPIO connections ("general-purpose input/output") respectively, and the power management unit 510 sends power control signals and power via a conventional power supply connection to the GPU & processing unit 506, which also supply power to the GSM 3G/4G module 508 via a conventional power supply connection. 506 and 508 also exchange status information and data via an USB connection and a status reporting connection.

The GSM 3G/4G module 508 is a communication module used for connectivity with the backend server that stores the captured images/video-footages of signages that provide information about the shops corresponding to the signages. Supervisor unit 512 is always powered on with a direct connection to the battery (not shown) via 510. It checks if the vehicle on which the edge device 516 is mounted is "on" or "off" by getting the data from vehicle unit 514. If the vehicle is "on", 512 will turn on, via power management unit 510, the power of the other units and AI engine (not shown, but loaded in the processing unit 506) will start working. If the vehicle is "off", 512 sends signal over UART to GPU & processing unit 506 to shutdown itself. The vehicle unit 514 can be connected to ACC ("Adaptive Cruise Control") sensor of the car or to OBD-II connector (note, the connector is used to access the vehicle's computer for various tasks, such as emissions tests and diagnostics. The OBD-II port is where the Hum System is installed so that the network can communicate with the vehicle directly) to check if the vehicle is "on" or "off".

The placement of the camera 502 can be inside a vehicle on the windshield or on top of the vehicle but tilted slightly towards the right. The orientation of the camera towards the right helps in getting a good view of the roadside and the shop banners. The vehicle is referred to as the patrol vehicle because it will be patrolling the city neighborhoods for finding out various violations, one of which is the shops keeping signages that are not complying with their licensed dimensions. The patrolling vehicle must be travelling on the rightmost lane of the road to avoid disturbing other vehicles and cause traffic. It also helps in getting a clear picture of the shop banners and reading their names. Under this setting, the said moving patrol vehicle is going on the rightmost lane or the said slow lane. The described setup can be installed in any other moving vehicle like a bus or a van. The mentioned setup does not require information to be sent over the internet to a server to estimate the signages' dimensions. The placement and positioning of the camera is well within the scope of this disclosure. It is noted that the above setup is for a traveling condition in which the traveling direction of a vehicle must be on the right-hand side of a road. For a different traveling condition (such as vehicles traveling on the left-hand side of a road), the setup would conceivably need to be adjusted to fit the condition correspondingly.

In some embodiments, the vehicle mounted camera 502, with a resolution set at 1920×1080, takes in a continuous video stream at 30 fps ("frames per second") of the roadside scene. The video stream is converted to an image frame while the camera-carrying vehicle is patrolling the shopping district. The converted image is then processed on the edge device 516 to detect signages in the scene presented in the image. It is noted that only the shop signage that is nearest to the moving vehicle in the scene is processed by the model so that the segmentation, tracking, counting, and then dimension estimation of the signage is performed accurately, because if every board in the scene is detected, then the segmentation, tracking, and counting will not be performed accurately.

The raw camera footage is passed to a model backbone (executed in the GPU & Processing Unit 506) to extract spatial features, said spatial features are then passed to a neural network (executed in the GPU & Processing Unit 506) for object localization, the network predicts the object location in the image based on object characteristics, the predicted object locals are then passed to a tracking algorithm (also executed in the GPU & Processing Unit 506), the tracking algorithm tracks object locals based on previous image frames' features which include spatial and local details.

The segmentation part is done using the features extracted from the model backbone to predict pixelwise areas of interest, the predicted areas are then passed as binary image masks into a dimension estimation network parallelly for each identified object, which estimates the height and width dimension given the mask image reference.

The embodiment of the system is also shown in FIG. 2.

Training Data Collection and Annotation

The shop signage dimension dataset is a novel dataset that comprises videos and dimensions of signages. As mentioned above, the videos of the signages are taken from a moving vehicle, with the help of a mobile cameras kept horizontally inside the car windshield. The actual dimensions of the signages are manually measured and then recorded in one or more excel sheets containing width and height in meters of the measured dimension. The dataset does not include the depth measurement of the shop signage, as the depth measurement of the shop signage is not a data to be concerned with.

The dataset was collected from multiple countries. During the video data collection, the resolution of the camera is set to Full HD (1920×1080p). The dimensions of the signages were obtained by skilled personnel with the help of laser pointing tools. At least 2 persons are required to measure the dimension of shop signage properly. It should be noted that not all shop signage surfaces reflect the laser satisfactorily. For example, black and blue colored signages would not reflect the laser light. In those cases, other conventional manual measurement approaches would be applied.

Images of the signages were extracted and three images of each shop signage are labeled using polygon masks. These three images are the nearest images where the image-taking vehicle would be closest to the shop signage on the right side (in the case where vehicles drive on the right side of a road) of the road on which the vehicle is driving on. The dataset records thousands (for example, 6331) of shop-signages.

Data Preprocessing

The aforementioned images are annotated for the sake of identification, and the annotated images are combined with the width and height information from the aforementioned excel sheet to form a final JSON file (note, JSON is an open standard file format and data interchange format that uses human-readable text to store and transmit data objects consisting of attribute-value pairs and arrays. It is a common data format with diverse uses in electronic data interchange, including that of web applications with servers) which contains the dimension information and the mapping of the corresponding shop signage image. The images are resized from 1920×1080 to 500×500 to fit the model training configuration. The training data (combined, labeled, and annotated) will be used to feed into the neural network model to train it.

Model Architecture

The images of the signages must be segmented first to get the correct quadrilateral pixels. Each of the shop signage should be of different segmentation pixel masks. Hence the right choice for architecture would be of instance segmentation.

It is noted that instance segmentation is an image segmentation technique in which multiple instances of the same object category within the same image will be masked with different mask colors or values, in contrast to semantic segmentation wherein multiple instances of the same object category within the same image will be masked with the same mask pixel colors or values.

Figure 6:
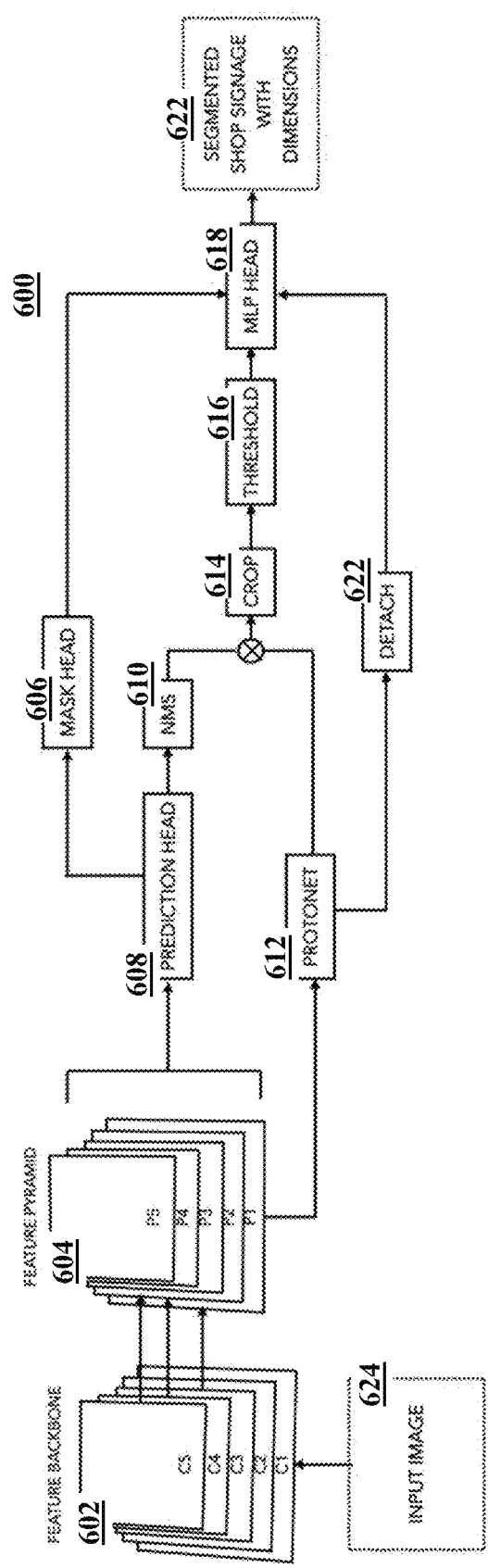
FIG. 6 schematically renders a neural network architecture for object localization dimension estimation of the object of interest.

Our Neural Network architecture for dimension estimation along with YOLACT is shown in FIG. 6. We henceforth refer to this architecture are YOLACT-DE (YOLACT-Dimension Estimation).

The YOLACT-DE architecture, as shown in the setup 600 of FIG. 6, is responsible to do object localization and dimension estimation of the object of interest.

The model of the YOLACT-DE architecture starts out by processing the input RGB image 624 using the feature backbone 602, which is an essential component, usually used in image perception tasks with Deep Learning Models to extract features by changing the image RGB representation into one more focused on the task at hand, here it would focus on what is the usual shape of shop boards (note, the terms "shop board" and "shop sign" are interchangeable throughout this disclosure) and their colors. Conventionally, there are many feature backbones but the one applied in many embodiments here is lightweight for the edge case system, it's called ResNet50. ResNet-50 is a convolutional neural network that is 50 layers deep. You can load a pretrained version of the network trained on more than a million images from the ImageNet database. The pretrained network can classify images into 1000 object categories, such as keyboard, mouse, pencil, and many animals. Among many layers (i.e., $C_1, C_2, \ldots C_n$) within the feature backbone 602, each $C_n$ is a different layer extracting more detailed features from the image while reducing the size by passing smaller images but with more features to the next layer, and each $C_n$ layer includes three layers of Convolutional Neural Networks (CNN) of different sizes. Each CNN includes filters to extract features from the image, and those filters are trained to figure out the shop boards, from shape to color to other features.

Feature Pyramid 604 is used to process the results of the feature backbone 602 at different scales. The Feature Pyramid is considered as the neck of the model 600, and it is used to make the model recognize the shop board features regardless of its size. Even if the model encounters a bigger or smaller than normal shop board, it should be able to recognize the board. In many embodiments, Path Aggregation Network (PANet), designed to be fast for edge systems, is applied as the Feature Pyramid 604. Again, Feature Pyramid 604 is used to make the model 600 able to recognize the same object (i.e., the same shop board) that are shown in different sizes across different images.

Each $P_n$ in Feature Pyramid 604 has two CNN layer pairs with different scale and output channels while having a consistent kernel size of 1 and 3. In each $P_n$, the two CNNs are executed in a sequential manner as pairs and then proceed to save the result in a list that is passed to the prediction head.

The Protonet ("Prototypical Network") 612 is used to carry out mask segmentation for the identified shop board. Protonet would create a binary mask pixel-wise to the exact location where we have the shop boards identified. The Protonet 612, a fully convolutional neural network, is trained to find the pixel-level segmentation of the identified shop board even for new unseen locations and boards. The fully convolutional neural network is trained to find the pixel level segmentation for the identified shop signage, an important step for measuring the dimensions of an identified object. The network is fine-tuned and trained with augmentation options for the purpose of generalizing to new scenes and/or new shops, based on training dataset collected from one city, and the trained network is tested in a different city showing a great performance generalizing to new scenes/shops.

Prediction Head 608 is used to predict the location of the object with bounding boxes and what class it belongs to. 608 also helps the Protonet 612 by giving a confidence coefficient for each mask.

The NMS (Non-Max Suppression) layer 610 is a non-trainable post-processing layer that merges overlapping bounding box predictions into one, making the model predict each shop once in each frame.

The Mask Head 606 is responsible for producing a coefficient that is used to improve the Protonet results. It's linearly multiplied by the Masks produced from the Protonet 612, we average the proto-types (masks) and then inserted them into the MLP 618 to make the dimension estimation for each mask.

The Crop layer 614 is a non-trainable post-processing layer that crops the mask prediction outside the boundary of the bounding box predicted.

The threshold layer 616 is a non-trainable post-processing layer that filters out low-confidence predictions.

The Multi-layer Perceptron (MLP) layer 618 is a fully connected network that is pre-trained by using manually collected training samples, and is used to estimate (by inferring results) the shop dimensions from the mask predicted.

Detach 620 clears the backpropagation graph to make the MLP 618 learns only from the mask result and not from the main image. Detach 620 decouples the MLP 618 from the main system (which refers to the feature backbone 602, feature pyramid 604, and Protonet 612 collectively, whereas the detach layer 620 clears out the gradient graph.)

The scope of the application is that it must run on the portable GPU hardware in a moving car. Thus, a high-performance real-time instance segmentation model architecture was selected as the first stage of a two-stage Neural Network. YOLACT is the preferred instance segmentation neural network that has proved to be of strong segmentation results in our experiments. YOLACT stands for You Only Look At Coefficients as described in the paper of "YOLACT: Real-time Instance Segmentation"

YOLACT has the advantage over other instance segmentation algorithms like MASK-RCNN in the fact that it is a single-stage mask segmentation neural network architecture. Other preceding neural network architectures, such as Mask-RCNN, are two staged architectures, which require the region pooling first to happen and then it is followed by the bounding box detection as well as segmentation. Unlike the two staged architectures, YOLACT, being a single-state architecture, requires much less processing time and computation power. YOLACT produces the object detection vector of mask coefficients for each anchor box as well as the prototype mask through two parallel branches.

The prototype mask is one of the 100 prototype mask candidates obtained from the Protonet layer 612 as given in FIG. 6. It is generated by the Fully Convolutional Network (FCN) which is branching out parallel to the detector head. Once each detected shop signage instance goes through the NMS (Non-Max Suppression) with a high threshold, a mask is constructed for that instance by linearly combining the prototype branch with the mask coefficient branch. NMS is the method where multiple bounding boxes are considered to filter out the best bounding box which has the highest confidence and thus represents the object better. The NMS is followed by a sigmoid non-linearity to produce the final masks.

Figure 8:
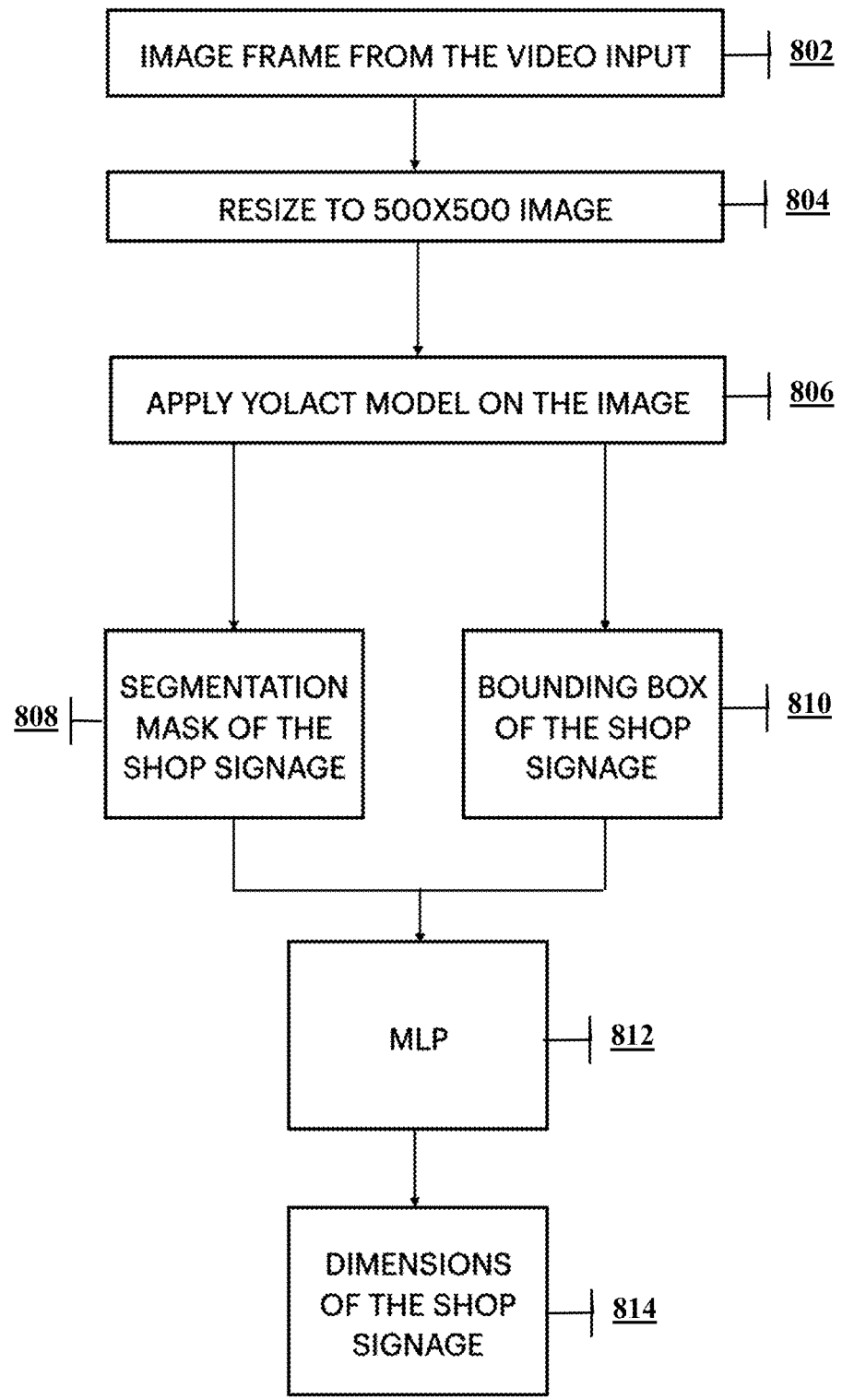
FIG. 8 schematically shows a flow of predicting the dimensions of a shop signage.

Shown in FIG. 8 is the flowchart of how the YOLACT-DE model predicts the dimensions of the shop signage which is present in a given image while the patrol car is in motion. The figure schematically presents a pipeline inference of the algorithm applied by the model, starting with reading video input (802) to resize (804), then proceeding into applying the YOLACT backbone (ResNet50, 602 of FIG. 6) into the image to extract features (806), we would pass the extracted features into segmentation head (808) to convert the mask into the signages. At same time, the features will also be passed into the bounding box head to conduct the object detection and localization (810). The outputs of the 808 and 810 will be merged and passed into MLP step (812), the MLP step will produce the dimensions of the masks discovered, and the produced dimensions are outputted (814).

Training Network Configuration

We use ResNet-50 as our default backbone feature extractor and a base image size of 500×500. Once the image features are extracted it is sent to the Feature Pooling Network which acts as the neck in the Neural Network. Neck is the terminology used in neural networks which comes after the backbone feature extractor to pool relevant regions of interest (ROI) from the images. The head follows the neck for various output forms at the end of the neural network.

In our training configuration of YOLACT, there is a bounding box regression head with the object detection class with cross-entropy loss, a mask head for the prototypes with a k value of 100 masks to be trained, and a segmentation head that uses cross-entropy loss.

the Prototype Masks

Figure 7:
FIG. 7 shows a grayscale image of a few masked objects, wherein the most highlighted masked object is a shop signage.

As mentioned previously, a prototype mask is generated by the branch of the neural network that has the fully convolutional network. In this branch, all layers consist of only convolutional operations only even until the last output layer. This branch is thus called the Protonet (612 of FIG. 6). In a regular convolutional neural network, the initial layers would have convolution operations, however, in order to create the final output as categorical or continuous, fully connected layers or dense layers are used. The idea of a prototype mask is to create the background and foreground masks for different candidate objects in the image. An example prototype mask involving the shop signage image is demonstrated in FIG. 7. As can be seen from the scene displayed in FIG. 7, there is a heightened highlight for the shop signage mask (the mask surrounded by the dotted lines) more than any other objects in the scene.

We then use the different prototype masks to calculate the mask loss using binary cross entropy. Each prototype mask represents a piece of foreground or background information in relation to an object of interest to teach the model to better understand the object of interest. In some embodiments, the system is populated to up to 32 prototypes (each of which handles one mask). Each prototype mask presents pixels for an object of interest with values, and the closer each of the value is to 1, the more confident the model is correct. In the end, we assemble all the prototypes into one mask that better focuses on all objects of interest with each object as different and distinct mask. With the final assembled mask, we filter low confident pixels then use Binary Cross Entropy (BCE) to calculate the loss.

BCE is a log loss, and it is used to calculate the loss of how close the predicted values (pixels, in our case) to the labeled ones. The way we use BCE is by setting each of the pixel's confidence value to the range of above 0.2 to 1 (i.e., (0.2, 1], indicating the model expects a presence of an object of interest in the pixel) or below 0 to 0.2 (i.e., [0, 0.2], indicating the model expects an absence of an object of interest in the pixel). Within the labeled image, we initially set up all objects of interest as pixels with a confidence value of 1 and no objects as pixels with confidence value of 0. Then, we use BCE to compare each predicted pixel to each labeled pixel for all classes in parallel. BCE value of 0 (meaning the loss value is 0) indicates that we have perfectly predicted all pixels correctly. A BCE value of 1 (meaning the loss value is 1), on the other hands, means we have predicted all pixels incorrectly. We then use the total loss values to do back-propagation and to adjust the various weights associated with the model to steer the model to what we want it to learn.

Loss Function Engineering for Dimension Estimation

The configuration mentioned above is enough for training a neural network with a dataset containing polygon masks of the signages. However, to obtain the height and width of the signages, additional regression of the two values is needed in the correct head of the YOLACT architecture (600 of FIG. 6).

We created a simple Multi-Layer Perceptron (MLP) (618 of FIG. 6) with six layers of neurons with Rectified Linear Units as the activation function. A Multi-Layer Perceptron is a neural network where all the layers of the neural network are connected to their respective consequent layer. The input of the MLP is the mask of shop signage (i.e., 606 of FIG. 6), and the output of this neural network will be just two values that represent the height and width dimensions (i.e., 622 of FIG. 6).

We selected the Protonet head to add the loss of creating a prototype representative mask that can be used for regressing the height and width of the shop signage. We have empirically concluded that when the mask size is at 150× 150, the loss value converges very well. This loss is referred to as hnw_loss. It is detached from the prototype mask loss. The loss function used is smooth L1.

At the YOLACT detector, we attach the MLP to the mask prediction layer to infer dimensions based on pixel-wise mask confidence for each shop signage. The MLP is designed to have weights corresponding to each pixel while being efficient enough for edge devices. The Protonet detachment to the MLP and mask prediction layer attachment of the MLP are shown in FIG. 6.

TABLE 1

Configuration parameters of the MLP
The configuration of the MLP is shown in the table below.

| Input neurons | Output neurons | Activation function |
|---|---|---|
| 900 | 900 | ReLU |
| 900 | 400 | ReLU |
| 400 | 102 | ReLU |
| 102 | 84 | ReLU |
| 84 | 48 | ReLU |
| 48 | 2 | ReLU |

Figure 9:
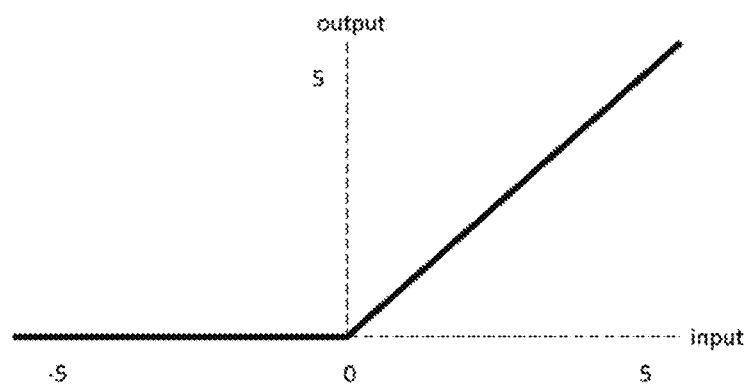
FIG. 9 schematically shows the piecewise linear function of a ReLU activation function that is often used in a neural network.

ReLU ("rectified linear activation function") is one of the activation functions for a neuron in a neural network. It produces the value of "0" as output for any negative input and linearly produces a positive value for all positive inputs, as shown in FIG. 9. The function has become the default activation function for many types of neural networks because a model that uses it is easier to train and often achieves better performance.

Model Training

Figure 10:
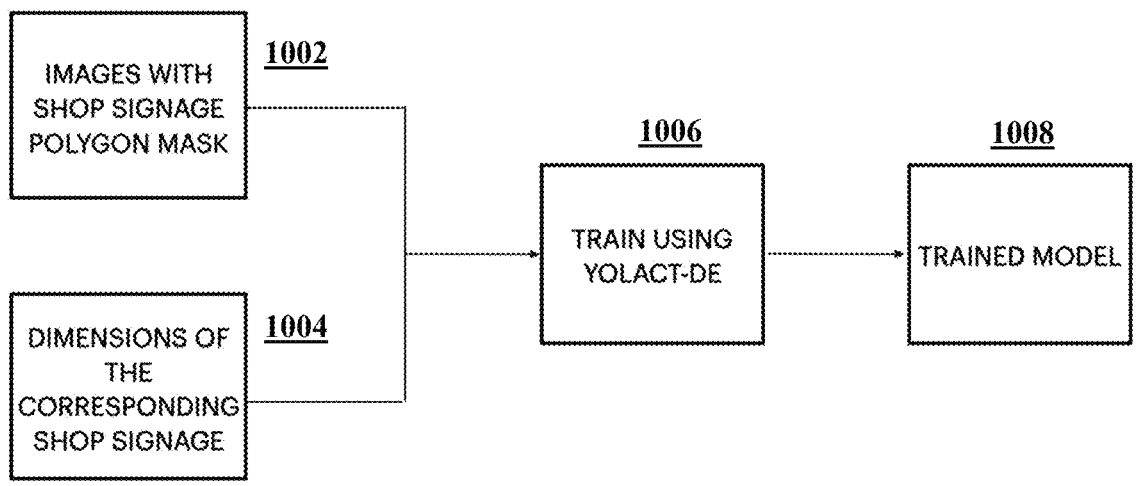
FIG. 10 schematically shows the training of the YOLACT-DE network with the labeled image and training dataset.

In some embodiments, the training dataset contains shop signage dimensions from multiple countries or areas. In one embodiment, the training dataset contains 5000+ samples collected from the signages in a different country other than the country where the model is deployed. In addition, the training dataset also contains 1331 signages collected from the country of deployment. FIG. 10 shows that the images that correspond to the training dataset's data are labeled with polygon masks (1002) are concatenated with the dimensions of signages contained in the training dataset (1004), and combined data (i.e., labelled image+dimension measurement) are, during the training time, sent to the YOLACT-DE network (1006) for creating a trained model (i.e., a trained neural network). Note, the polygon masks used for labeling the images that have shop signage (1002) are only the polygon masks for the shops that are nearest to the patrol car that captures images of the signages, as demonstrated in FIGS. 4A-4C and 7. The steps for obtaining the trained model has been described below.

The labeling of images with polygon masks (1002) is conducted at an instance segmentation level, meaning each object is labeled as points for polygon and bounding boxes. Specifically, 4 points for bounding boxes and 8 points for polygons to each sign board's corners are put at a few key geometry points, starting top left to bottom left then to bottom right, and finally top right, are labeled in a video format over every 5 frames per second and point interpolation is conducted in between and manually fixed any inaccuracies. Only the closest shop to the frame is labeled, and only the frames where we have a completely visible shop sign are accounted, discounting partial ones. Also, in training the model, the model is taught to recognize only completely visible sign boards.

The shop dimensions were measured with laser devices during the data collection and were added manually to the annotation for each sign board. During the data collection, we collect many videos for every 15 mins of a drive-through. Then we label each video as a labeling batch then we concatenate all videos in a training set and a validation set in a custom video coco annotation format along with the measured shop dimensions. At this stage, we have also trained with a semi-supervised system utilizing all newly collected data without manual labeling to improve the model performance.

The same training network configuration mentioned in the earlier section was applied to both the datasets separately and collectively (meaning that the training configuration is used to train the network separately in the two datasets but with the same configuration and methodology.) The annotated images were first resized to 500×500 and then sent to the modified neural network (i.e., the YOLACT-DE model), in a batch with a size of 8 or 16 samples. Each sample contains an image containing a shop signage labeled by a polygon mask and the corresponding height and width of the shop signage present in the image. Images that do not have signages were not used in the first setup. The validation images (which are separate from the training images) are curated by taking 20% samples from the dataset. While training based on the samples from both countries, validation samples were taken from both countries to constitute the 20% of the total dataset.

The model was trained for 200 epochs such that both the segmentation and dimension estimation loss come to the global optima. It is noted that the global optima refer to the convex optimization problem of finding the lowest loss to the model. We train the model with excessive epoch numbers in relation to the model size and the optimizer we are using (stochastic gradient descent) in order to make sure that the model performance is optimized and the validation loss will not drop anymore. All losses in the neural network architecture were aggregated to a single loss. The loss is aggregated by summing the losses for each training batch/image. Since we use stochastic gradient descent to update the model weights, we calculate each image's loss and update the weights for each image, in order to make sure the system estimates the global optima accurately and update the model for each image's loss to converge faster. The loss on the validation set is calculated after every epoch. During validation, two kinds of losses (smooth_L1 loss ("smooth L1 loss"), and mape_loss ("mean average precision error loss") were observed for dimension estimation to ensure that the neural network is trained properly by comparing the estimated dimension values (estimated by the model) with the measured dimension values that come with the validation samples.

Note, smooth L1 loss is used for doing box regression on some object detection system, and this loss is less sensitive to outliers. Mean Average Precision is a metric used to evaluate object detection models, and the loss thereof is used to evaluate the loss under the metric. We train with the smooth_L1 loss while validating performance with mape_loss, we use smooth_L1 loss for the dimension regression, along with BCE (Binary Cross Entropy) for masks, classification loss also uses BCE, and object detection loss using regression (uses smooth_L1 loss for the object localization). Therefor we have 4 different losses, and we apply them to each image separately and collectively and we use them to update the weights of the model. We use all of them under all circumstances other than the dimension regression loss, if we have an empty image (i.e., image without shop sign), then we apply all three losses and skip the height and width dimension estimation loss.

Augmentations

In order to improve/enhance the accuracy of the segmentation head as well as the dimension estimation head, a variety of augmentations are applied, during the model training, on the samples. The augmentation options we use for color help to remove the model dependency on certain colors, the ones applied for blurring improved the motion blur cases in case of moving too fast or objects passing, and the ones applied for flipping help the model to detect the shops in the left side while driving and to detect signages close to the ground. JPEG compression helps when the compressed image is applied in the deployment settings.

In general, augmentations are conducted after we have all images loaded in the data-loader. During the training, a certain percentage of loaded images are randomly chosen to undergoing an augmentation. For example, for the augmentation of flipping, we have 20% of loaded images to have vertical or horizontal flipping before passing them into the model. Likewise, for all augmentation options, a portion of all images are undergoing with a chosen augmentation option.

Taking the vertical flip as an example of how an augmentation helps, the vertical flip will mostly help the detection layer to detect the board, whereas the segmentation layer will benefit less as it's already tasked to perform the segmentation in the given detected area. Since the objects the model is detecting are quadrilaterals, by the virtue of quadrilaterals, both horizontal and vertical axis-based reflection or rotation of 180-degree will not change the ratio of the geometrical shape for quadrilaterals. Although, 90 degrees rotation would swap/flip the width and height co-ordinates, which is what we did as part of a custom augmentation experiment that would flip the dimensions (width being flipped to height, and height being flipped to width), the flip gives a performance boost to rare boards that have a height more than 2× times the width.

Taking the zoom-in/zoom-out as another example of how an augmentation helps, a small zoom-in and zoom-out would help the model to detect large and small boards by changing the shown board size, this option is implemented over the depth estimation, and it is done for the model to gain more robustness by having a bit smaller or a bit larger board with the same expected dimensions.

Photo metric distortion is a color hue augmentation to help the model detect boards with unusual colors or under unusual lighting conditions such as sunrise, sunset, or nighttime, and it also helps the segmentation to differentiate between close-by boards.

RGB shift is an augmentation that shifts out the RGB spectrum. It helps out in a similar way as the Photo metric distortion, but with the added benefit of performing well with RGB cameras and other dashcams allowing the use of any available camera.

JPEG compression is an augmentation applied in the case of that the dashcam compresses the image into jpeg, then the performance should still be great.

Solution Deployment

Figure 11:
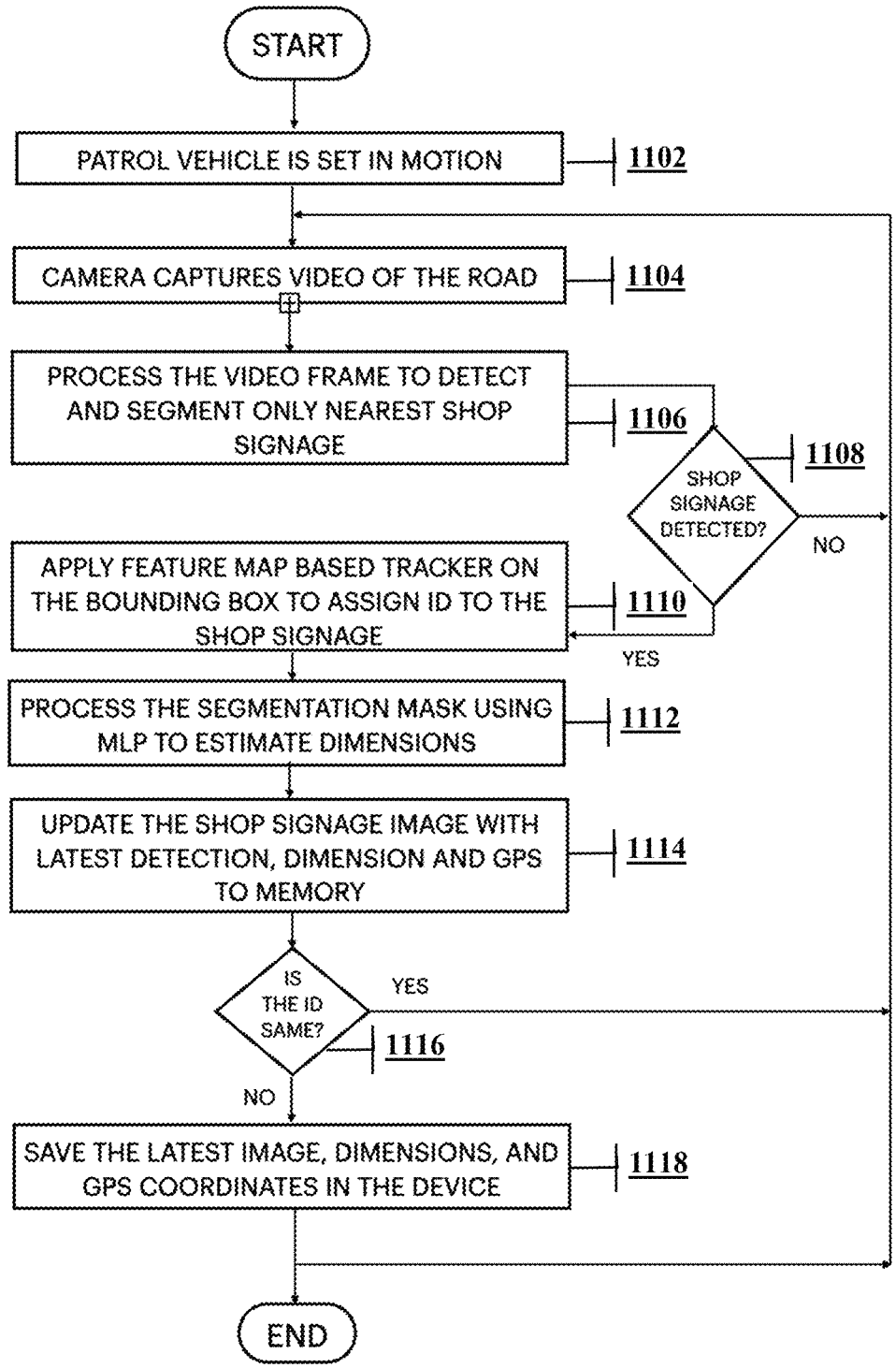
FIG. 11 schematically shows an overall flowchart of collecting videos and applying a trained model to estimate dimensions of detected signages.

The hardware and the camera are deployed inside the patrol vehicle as described in the system overview (FIG. 2). The hardware and camera are connected to the 12V battery connection inside the patrol vehicle. As shown in FIG. 11, the patrol vehicle scans the streets (1102, and then 1104) which have shops by going on the rightmost lane. When the vehicle passes by a lane containing shops, the camera sends each video frame to the system. As shown in FIG. 2, in real-time the YOLACT-DE model 228 is loaded/deployed in the memory 224 along with the feature-map-based tracking module 230. Once the deployed model checks if shop signage has been detected, and if it detects the nearest shop (1106) from the image frame in real-time, it segments the signage at the same time (1106) using the Protonet layer of YOLACT. This is because YOLACT is a one-stage detection and segmentation network. If the shop signage is not detected, the video stream is processed until shop signage is detected (i.e., that is the "NO" branch of 1108 leads to).

As shown in FIG. 11, once the system detects the shop signage (1108), it segments the signage (1110, and then 1112) and assign a tracking ID based upon a feature-map-based tracking algorithm (1110). If the shop signage is not detected, then the video stream is processed until shop signage is detected (i.e., that is the "NO" branch of 1108 leads to). The segmentation mask obtained from the YOLACT protonet in step 1106 is sent to the MLP to obtain the dimensions of the shop signage (1112). This detection image is updated in the memory as the best representation of the shop signage (1114).

A new shop signage detected at 1106 is differentiated by the feature-map validation of the tracking module at 1110. It indicates that a new tracking ID is assigned at 1110. In this case, at 1116, the system checks if a new tracking ID is assigned. If the ID is new, the last image of the shop signage in memory is saved on the device along with the correct and corresponding GPS coordinates (1118). Otherwise, if the ID is the same as the previous shop signage, the system looks for further detections in the video stream by going back to step 1104.

It should be noted that the tracking module applied at 1110 is inserted into the system only at the time of real-time inference. The tracking module is not elementary to the YOLACT-DE network for shop signage dimension estimation. However, the application of it to avoid multiple dimension estimation of the same shop being recorded.

Result

The results are shown in FIGS. 4A, 4B, and 4C. The system operates in real-time by detecting and segmenting the shop followed by dimension estimation while counting and assigning unique ID to each shop. The shop in FIG. 4A presents a medium sized shop, with banner ID, height, width, and count as number of uniquely detected shops, FIG. 4B shows a detected shop with ununified color and board hue. FIG. 4C shows a large detected board. Additionally, the JSON files are generated that indicate the image file name along with the dimensions (height, and width) of the shop signage. The information can be later sent over a 5G network to a backend system to display it on a dashboard for viewing it online or other commonly used means.

Additional Embodiment Details

The present disclosure may be a system, a method, and/or a computer program product. The computer program product and the system may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device or a computer cloud via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Java, Python or the like, and conventional procedural programming languages, such as the "C" programming language or similar programming languages, and scripting programming languages, such as Perl, JavaScript, or the like. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. These computer readable program instructions may be executed in a processor local to the claimed system or apparatus, or can, during the execution, by migrated to a remote computing system such as a cloud to execute, or can be partially executed in the processor local to the claimed system or apparatus and partially executed in a remote computing system.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Notes

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Certain embodiments of this disclosure are described herein, including the best mode known to the inventors for carrying out the disclosure. It should be understood that the illustrated embodiments are exemplary only, and should not be taken as limiting the scope of the disclosure.

Benefits, other advantages, and solutions to problems have been described herein with regard to specific embodiments. However, the benefits, advantages, solutions to problems, and element(s) that may cause benefit, advantage, or solution to occur or become more pronounced are not to be construed as critical, required, or essential features or elements of the claims. Reference to an element in the singular is not intended to mean "one and only one" unless explicitly so stated, but rather "one or more." As used herein, the terms "comprises", "comprising", or a variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for practice unless expressly described as "essential" or "critical". Moreover, those skilled in the art will recognize that changes and modifications may be made to the exemplary embodiments without departing from the scope of the present disclosure. Thus, different embodiments may include different combinations, arrangements and/or orders of elements or processing steps described herein, or as shown in the drawing figures. For example, the various components, elements or process steps may be configured in alternate ways depending upon the particular application or in consideration of cost. These and other changes or modifications are intended to be included within the scope of the present disclosure, as set forth in the following claims.

The invention claimed is:

1. A computer-implemented method for real-timely estimating dimension of signage, comprising:
    capturing and storing a first set of still images or video footages that contain a first set of signages by using a first photographing device carried on a first moving vehicle;
    extracting a first set of spatial features from the first set of still images or video footages;
    detecting a first set of signages and a first set of masks by using a Fully Convolutional Neural Networks (FCNN) based on the first set of spatial features, wherein the step of detecting the first set of signages and the first set of masks comprises calculating a mask loss value using Binary Cross Entropy (BCE) for each of the first set of masks, and calculating a first total loss value based on the mask loss value for each of the first set of masks, and using the first total loss value to adjust, using a stochastic gradient descent, a plurality of weights associated with the FCNN, via back-propagation, to steer the FCNN to learn from the first set of still images or video footages;
    localizing the first set of signages by using a tracking system to identify ownership information of each sign of the first set of signages to produce a first set of identification associated with the first set of signages;
    passing the first set of signages and the first set of masks into a pre-trained Multi-Layer Perceptron (MLP) neural network to estimate a first set of dimension values by regressing dimension values based on a loss function applied on the first set of masks, wherein each dimension value in the first set of dimension values contains a height value and a width value; and
    recording on an edge device, and transmitting and registering the first set of signages in association with the first set of identification and a first set of dimension values to a remote database.

2. The computer-implemented method of claim 1, the step of localizing further comprising:
    obtaining a first set of GPS (Global Position System) location values corresponding to the first set of signages, and
    associating the first set of GPS location values with the first set of signages.

3. The computer-implemented method of claim 1, wherein the pre-trained MLP neural network is trained, in a training session, based on a second set of still images or video footages that contain a second set of signages, wherein the training session comprises:
  extracting a second set of spatial features from the second set of still images or video footages,
  detecting a second set of signages and a second set of masks by using the FCNN based on the second set of spatial features,
  labeling each of the second set of signages with its corresponding polygon marks in the second set of masks,
  concatenating each of the second set of still images or video footages with its corresponding dimension values in the second set of dimension values, to form a set of combined sample data, and
  feeding the set of combined sample data to the MLP neural network to create a trained model;
  wherein each dimension value in the second set of dimension values contains a height value and a width value that are manually measured, and the labeling comprises putting points at corners of each of the second set of signages that are fully visible, and
  wherein the step of detecting the second set of signages and the second set of masks comprises calculating a mask loss value using BCE for each of the second set of masks, and calculating a second total loss value based on the mask loss value for each of the second set of masks, and using the second total loss value to adjust, using a stochastic gradient descent, a plurality of weights associated with the FCNN, via back-propagation, to steer the FCNN to learn from the second set of still images or video footages.

4. The computer-implemented method of claim 3, wherein during the training session, 20% of the set of combined sample data are reserved as a set of validation sample data to be used in a validation session, wherein during the validation session, the set of validation sample data is used to calculate a smooth_L1 loss value (Smooth L1 Loss) and a mape_loss value ("mean average precision error loss") to monitor the quality of the training of the MLP neural network by comparing the dimension values estimated by the MLP neural network and the measured dimension values that come with the set of validation sample data.

5. The computer-implemented method of claim 3, further comprising:
  augmenting, as a part of the training session, to enhance the accuracy of training, by removing the MLP neural network's dependency on color, size of the second set of still images or video footages, lighting condition under which the second set of still images or video footages are captured, or the type of photographing device used for capturing the second set of still images or video footages.

6. The computer-implemented method of claim 3, wherein the second set of still images or video footages are captured by a second photographing device mounted on a second moving vehicle at a different time and location from when and where the first set of still images or video footages are captured.

7. A system, comprising:
  an edge device, a photographing device that are onboard a first moving vehicle, wherein the edge device comprises a GPU (Graphics Processing Unit), a processor, one or more computer-readable memories and one or more computer-readable, tangible storage devices, a GPS (Global Positioning System) Unit, a GSM (Global System for Mobile Communications) module, a power management unit, a supervisor unit, and a control unit, and a portable computing toolkit,
  wherein the photographing device is connected to the edge device for captured video stream of roadside scenes to be channeled to the edge device's video buffer, and the photographing device is placed inside the first moving vehicle on the windshield or on the top of the first moving vehicle, to perform operations,
  the operations comprising:
  capturing and storing a first set of still images or video footages that contain a first set of signages by using the photographing device,
  extracting a first set of spatial features from the first set of still images or video footages, detecting a first set of signages and a first set of masks by using a Fully Convolutional Neural Networks (FCNN) based on the first set of spatial features, wherein the step of detecting the first set of signages and the first set of masks comprises calculating a mask loss value using Binary Cross Entropy (BCE) for each of the first set of masks, and calculating a first total loss value based on the mask loss value for each of the first set of masks, and using the first total loss value to adjust, using a stochastic gradient descent, a plurality of weights associated with the FCNN, via back-propagation, to steer the FCNN to learn from the first set of still images or video footages,
  localizing the first set of signages by using a tracking system to identify ownership information of each sign of the first set of signages to produce a first set of identification associated with the first set of signages,
  passing the first set of signages and the first set of masks into a pre-trained Multi-Layer Perceptron (MLP) neural network to estimate a first set of dimension values by regressing dimension values based on a loss function applied on the first set of masks, wherein each dimension value in the first set dimension values contains a height value and a width value, and recording on the edge device, and
  transmitting and registering the first set of signages in association with the first set of identification and a first set of dimension values to a remote database,
  wherein the extracting, detecting, and passing steps are carried on by one or more computer programs loaded in the one or more computer-readable memories and executed by the processor or the GPU.

8. The system of claim 7, the step of localizing further comprising: obtaining a first set of GPS location values corresponding to the first set of signages, and associating the first set of GPS location values with the first set of signages.

9. The system of claim 7, wherein the pre-trained MLP neural network is trained, in a training session, based on a second set of still images or video footages that contain a second set of signages, wherein the training session comprising:
  extracting a second set of spatial features from the second set of still images or video footages,
  detecting a second set of signages and a second set of masks by using the FCNN based on the second set of spatial features,
  labeling each of the second set of signages with its corresponding polygon marks in the second set of masks,
  concatenating each of the second set of still images or video footages with its corresponding dimension values in the second set of dimension values, to form a set of combined sample data, and
  feeding the set of combined data to the MLP neural network to create a trained model, wherein each dimension value in the second set dimension values contains a height value and a width value that are manually measured, and the labeling comprises putting points at corners of each of the second set of signages and only the completely visible signages in the second set of signages are labeled, and wherein the detecting a second set of signages and a second set of masks by using the FCNN based on the second set of spatial features comprises calculating a mask loss value using BCE for each of the second set of masks, and calculating a second total loss value based on the mask loss value for each of the second set of masks, and using the second total loss value to adjust, using a stochastic gradient descent, the various weights associated with the FCNN, via back-propagation, to steer the FCNN to learn from the second set of still images or video footages.

10. The system of claim 9, wherein during the training session, 20% of the set of combined sample data are reserved as a set of validation sample data to be used in a validation session, wherein during the validation session, the set of validation sample data is used to calculate a smooth_L1 loss value (Smooth L1 Loss) and a mape_loss value ("mean average precision error loss") to monitor the quality of the training of the MLP neural network by comparing the dimension values estimated by the MLP neural network and the measured dimension values that come with the set of validation sample data.

11. The system of claim 9, wherein the second set of still images or video footages are captured by a second photographing device carried on a second moving vehicle at a different time and location from when and where the first set of still images or video footages are captured.

12. The system of claim 11, further comprising: augmenting, as a part of the training session, to enhance the accuracy of training, by removing the MLP neural network's dependency on color, size of the second set of still images or video footages, lighting condition under which the second set of still images or video footages are captured, or the type of the second photographing device.

* * * * *